US012769567B2

(12) United States Patent
Ramasamy et al.

(10) Patent No.: US 12,769,567 B2
(45) Date of Patent: Oct. 20, 2026

(54) MANAGING DESKTOPS AT AN INFORMATION HANDLING SYSTEM

(71) Applicant: Dell Products L.P., Round Rock, TX (US)

(72) Inventors: Sudhakar Ramasamy, Tamil Nadu (IN); Ramanujam Kaniyar Venkatesh, Bangalore (IN); Jayaprakash K, Tamil Nadu (IN); Sangeetha C, Tamil Nadu (IN); Jyothi Bandakka Nanjappa, Bangalore (IN); Satya Prasad Mylvara, Sunnyvale, CA (US)

(73) Assignee: Dell Products L.P., Round Rock, TX (US)

( * ) Notice: Subject to any disclaimer, the term of this patent is extended or adjusted under 35 U.S.C. 154(b) by 267 days.

(21) Appl. No.: 18/769,876

(22) Filed: Jul. 11, 2024

(65) Prior Publication Data

US 2026/0017071 A1 Jan. 15, 2026

(51) Int. Cl.
*G06F 9/451* (2018.01)
*G06F 3/14* (2006.01)

(52) U.S. Cl.
CPC ............ *G06F 9/451* (2018.02); *G06F 3/1423* (2013.01)

(58) Field of Classification Search
CPC ...... G06F 3/04842; G06F 3/14; G06F 3/0481; G06F 16/9535
See application file for complete search history.

(56) References Cited

U.S. PATENT DOCUMENTS

| | | | | |
|---|---|---|---|---|
| 7,890,961 | B2 * | 2/2011 | Whittle | G06F 16/957 715/234 |
| 9,134,756 | B2 * | 9/2015 | De Paz | G06F 1/16 |
| 11,210,112 | B1 * | 12/2021 | Tan | G06F 9/542 |
| 2012/0151403 | A1 * | 6/2012 | Bhogal | G06F 3/1431 715/778 |
| 2017/0344218 | A1 * | 11/2017 | Jann | G06F 3/0483 |

OTHER PUBLICATIONS

"USB Blocker", Jan. 23, 2021, accessed from url: https://github.com/pwnslinger/USBlocker; 2 pages.

(Continued)

*Primary Examiner* — Phuong H Nguyen
(74) *Attorney, Agent, or Firm* — McDermott Will & Schulte LLP

(57) ABSTRACT

Managing desktops at an IHS, including: establishing a connection between a client IHS and a server IHS; requesting, by the client IHS and to the server IHS, user preferences associated with the client IHS and the user, the user preferences indicating GUI configurations; receiving, by the client IHS and from the server IHS, data indicating the user preferences; receiving, by the client IHS, user input indicating a selection of one of the desktop GUI configurations; displaying the selected desktop GUI configuration, including: identifying, based on the user preferences, monitors connected to the client IHS for displaying the selected desktop GUI configuration; identifying, based on the user preferences, a first subset of computer-executable applications associated with the selected desktop GUI configuration; and displaying the selected desktop GUI configuration on the first monitor, including displaying a graphical representation of the first subset of the computer-executable applications within the selected desktop GUI configuration.

18 Claims, 12 Drawing Sheets

(56) References Cited

OTHER PUBLICATIONS

"A Generic Device Class Filter Using WDF", viewed Oct. 22, 2024, accessed from url: https://www.osr.com/nt-insider/2020-issue1/a-generic-device-class-filter-using-wdf/; 19 pages.
"VirtualDesktop", Feb. 11, 2022, accessed from url: https://github.com/Grabacr07/VirtualDesktop; 4 pages.
"IVirtualDesktopManager interface (shobjidl_core.h)", Feb. 22, 2024, accessed from url: https://learn.microsoft.com/en-us/windows/win32/api/shobjidl_core/nn-shobjidl_core-ivirtualdesktopmanager; 2 pages.
"EnumDisplayMonitors function (winuser.h)", Oct. 12, 2021, accessed from url: https://learn.microsoft. com/en-us/windows/win32/api/winuser/nf-winuser-enumdisplaymonitors; 4 pages.
"WM_Displaychange message", Jan. 7, 2021, accessed from url: https://learn.microsoft.com/en-us/windows/win32/gdi/wm-displaychange; 2 pages.
"CBT_Createwndw structure (winuser.h)", Jul. 26, 2022, accessed from url: https://learn.microsoft.com/en-us/windows/win32/api/winuser/ns-winuser-cbt_createwndw; 2 pages.
"EnumWindows function (winuser.h)", Feb. 22, 2024, accessed from url: https://learn.microsoft.com/en-us/windows/win32/api/winuser/nf-winuser-enumwindows; 3 pages.
"SetWindowPos function (winuser.h)", Oct. 12, 2021, accessed from url: https://learn.microsoft.com/en-us/windows/win32/api/winuser/nf-winuser-setwindowpos; 5 pages.
"The Taskbar", Jan. 7, 2021, accessed from url: https://learn.microsoft.com/en-us/windows/win32/shell/taskbar#managing-taskbar-buttons; 8 pages.
"ITaskbarList interface (shobjidl_core.h)", Jul. 21, 2021, accessed from url: https://learn.microsoft.com/en-us/windows/win32/api/shobjidl_core/nn-shobjidl_core-itaskbarlist; 2 pages.
"IVirtualDesktopManager:: GetWindowDesktopId method (shobjidl_core.h)", Feb. 22, 2024, accessed from url: https://learn.microsoft.com/en-us/windows/win32/api/shobjidl_core/nf-shobjidl_core-ivirtualdesktopmanager-getwindowdesktopid; 2 pages.
Malistov, Alexey "How to get main window handle from process id?", Dec. 11, 2009, accessed from url: https://stackoverflow.com/questions/1888863/how-to-get-main-window-handle-from-process-id; 5 pages.

* cited by examiner

MANAGING DESKTOPS AT AN INFORMATION HANDLING SYSTEM

BACKGROUND

Field of the Disclosure

The disclosure relates generally to an information handling system, and in particular, managing desktops at an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In today's digital landscape, multitasking has become an essential aspect of productivity across various industries. Many professionals and individuals now utilize multi-monitor setups to enhance their workflow and increase screen real estate for managing numerous applications simultaneously. Multiple monitors are advantageous for increasing productivity and multitasking efficiency, benefiting professionals in various fields, enhancing gaming experiences, and aiding in data analysis and content creation.

SUMMARY

Innovative aspects of the subject matter described in this specification may be embodied in a method of managing desktops at an information handling system, the method including establishing a connection between a client information handling system (IHS) and a server IHS; requesting, by the client IHS and to the server IHS, user preferences associated with the client IHS and the user, the user preferences indicating two or more desktop graphical user interface (GUI) configurations; receiving, by the client IHS and from the server IHS, data indicating the user preferences; receiving, by the client IHS, user input indicating a selection of one of the desktop GUI configurations; displaying the selected desktop GUI configuration, including: identifying, based on the user preferences, one or more monitors connected to the client IHS for displaying the selected desktop GUI configuration; identifying, based on the user preferences, a first subset of computer-executable applications, of a plurality of computer-executable applications, associated with the selected desktop GUI configuration; and displaying the selected desktop GUI configuration on the first monitor, including displaying a graphical representation of the first subset of the computer-executable applications within the selected desktop GUI configuration.

Other embodiments of these aspects include corresponding systems, apparatus, and computer programs, configured to perform the actions of the methods, encoded on computer storage devices.

These and other embodiments may each optionally include one or more of the following features. For instance, identifying creation of an additional desktop GUI configuration at the client information handling system, including: identifying a mapping of the additional desktop GUI configuration to one or more of the monitors; and identifying a second subset of the computer-executable applications associated with the additional desktop GUI configuration. Detecting an additional monitor connected with the client IHS, and in response: identifying a mapping of the additional monitor for the selected desktop GUI configuration. Updating the selected desktop GUI configuration, including updating a mapping of the monitors; and synchronizing the updates with the server IHS. Detecting launch of a new computer-executable application within the selected desktop GUI configuration; determining that the new computer-executable application is not allowed for the selected desktop GUI configuration; and blocking launch of the new computer-executable application for the selected desktop GUI configuration. Detecting connection of an external device to the client information handling system within the selected desktop GUI configuration; determining that the external device is not allowed for the selected desktop GUI configuration; and blocking connection of the external device for the selected desktop GUI configuration.

Particular implementations of the subject matter described in this specification can be implemented so as to realize one or more of the following advantages. For example, enhanced multi-monitor productivity, simplified task switching, optimized multitasking, improved collaboration, and enhanced security.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
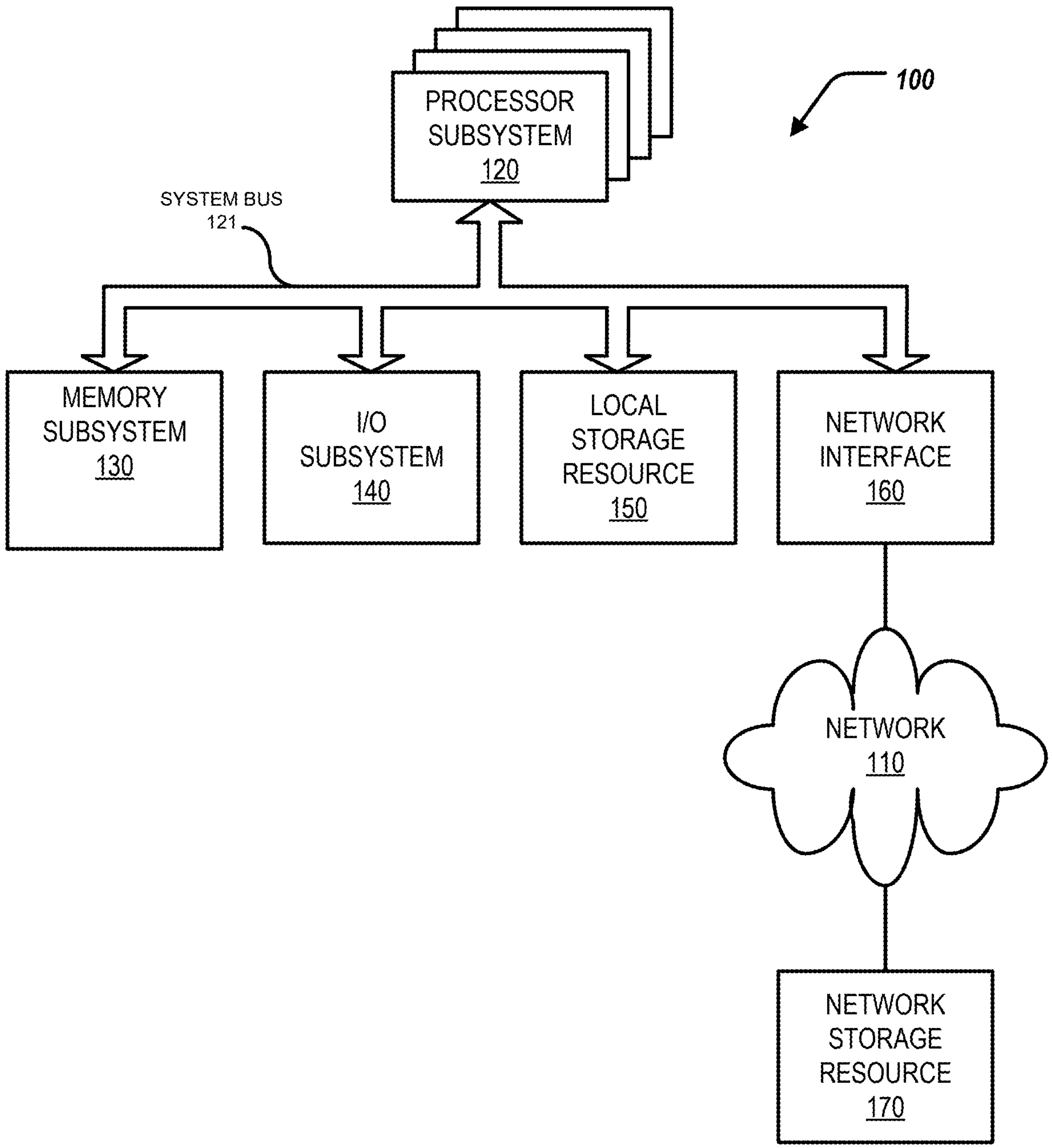
FIG. 1 is a block diagram of selected elements of an embodiment of an information handling system.

This disclosure discusses methods and systems for managing desktops at an information handling system. In short, multiple desktop graphical user interface (GUI) configurations can be mapped to one or more differing monitors. Furthermore, more than one desktop GUI configuration can be active at the information handling system at a time, e.g., across the monitors. Applications can be shared between the multiple concurrently active desktop GUI configurations. The desktop GUI configurations can be personalized and retained across sessions via a roaming user profile.

Specifically, this disclosure discusses a system and a method for managing desktops at an information handling system, including establishing a connection between a client information handling system (IHS) and a server IHS; requesting, by the client IHS and to the server IHS, user preferences associated with the client IHS and the user, the user preferences indicating two or more desktop graphical user interface (GUI) configurations; receiving, by the client IHS and from the server IHS, data indicating the user preferences; receiving, by the client IHS, user input indicating a selection of one of the desktop GUI configurations; identifying two or more monitors connected with the client IHS; displaying the selected desktop GUI configuration, including: identifying, based on the user preferences, a first monitor of the two or more monitors for displaying the selected desktop GUI configuration; identifying, based on the user preferences, a first subset of computer-executable applications, of a plurality of computer-executable applications, associated with the selected desktop GUI configuration; and displaying the selected desktop GUI configuration on the first monitor, including displaying a graphical representation of the first subset of the computer-executable applications within the selected desktop GUI configuration.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-12 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of the information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
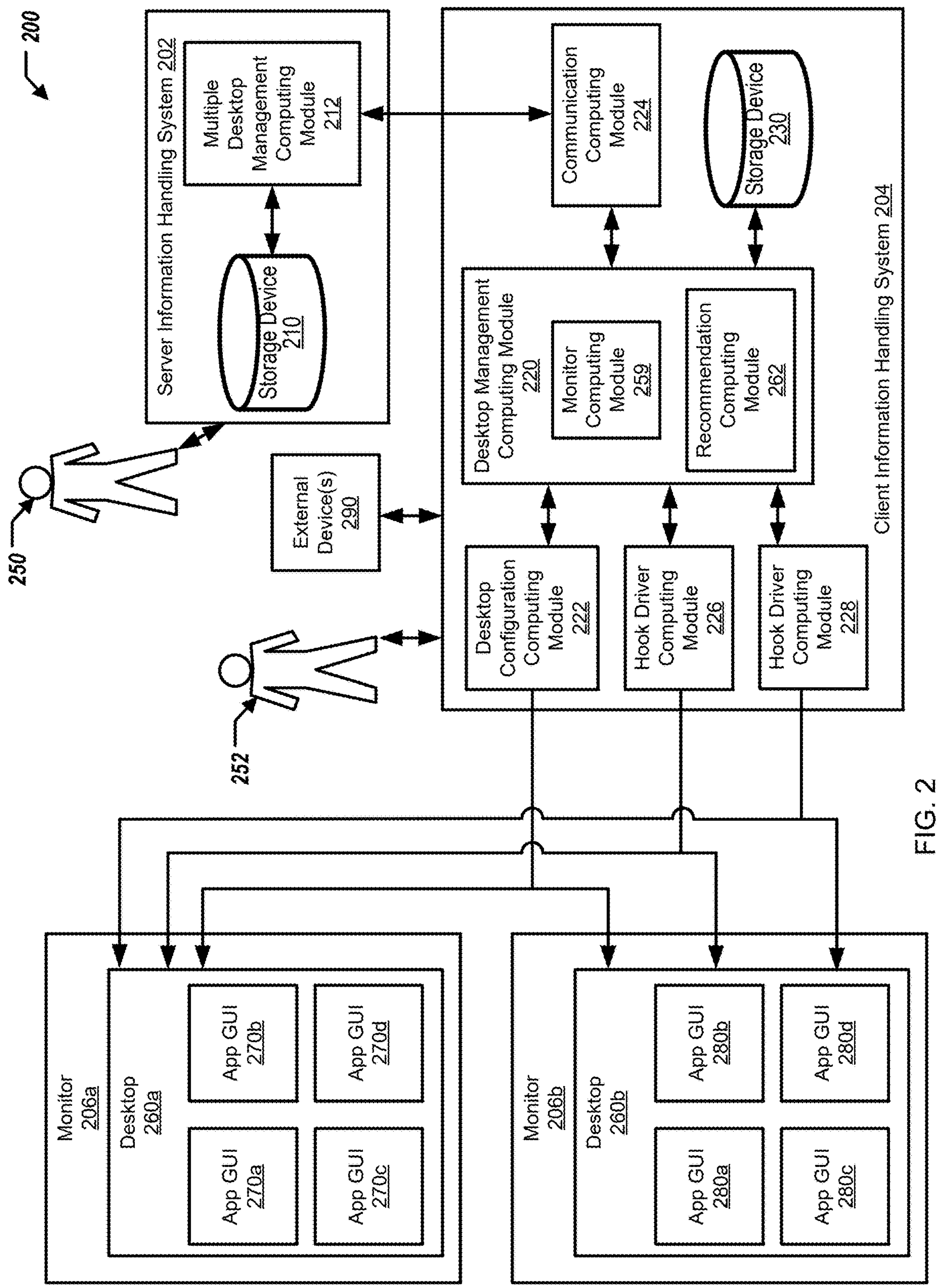
FIG. 2 illustrates a block diagram of a computing environment for managing desktops at an information handling system.

Turning to FIG. 2, FIG. 2 illustrates an environment 200 including a server information handling system 202, a client information handling system 204, a first monitor 206*a*, and a second monitor 206*b* (collectively referred to as monitors 206). The server information handling system 202 can include a multiple desktop management computing module 212 and a storage device 210. The client information handling system 204 can include a desktop management computing module 220, a desktop configuration computing module 222, a communication computing module 224, a hook driver computing module 226, a hook driver computing module 228, and a storage device 230. The desktop management computing module 220 can include a monitor computing module 259 and a recommendation computing module 262. In some examples, the server information handling system 202 is similar to, or includes, the information handling system 100 of FIG. 1. In some examples, the client information handling system 204 is similar to, or includes, the information handling system 100 of FIG. 1.

The server information handling system 202 is in communication with the client information handling system 204. The client information handling system 204 is in communication with the server information handling system 202 and the monitors 206. Specifically, the multiple desktop management computing module 212 of the server information handling system 202 is in communication with the communication computing module 224 of the client information handling system 204.

The multiple desktop management computing module 212 is in communication with the storage device 210.

The desktop management computing module 220 is in communication with the desktop configuration computing module 222, the hook driver computing module 226, the hook driver computing module 228, the communication computing module 224, and the storage device 230.

In short, multiple desktop GUI configurations can be mapped to one or more differing monitors 206. Furthermore, more than one desktop GUI configuration can be active at the client information handling system 204 at a time, e.g., across the monitors 206. Applications can be shared between the multiple concurrently active desktop GUI configurations. The desktop GUI configurations can be personalized and retained across sessions via a roaming user profile.

The client information handling system 204 establishes a connection with the server information handling system 202. Specifically, the communication computing module 224 of the client information handling system 204 establishes the connection with the multiple desktop management computing module 212 of the server information handling system 202.

The storage device 210 of the server information handling system 202 can store user preferences. Specifically, the storage device 210 stores user preferences of the user 252 of the client information handling system 204 and that are associated with the client information handling system 204. The user preferences can indicate desktop graphical user interface (GUI) configurations. The desktop GUI configurations can be displayed upon the monitors 206, described further herein.

The desktop management computing module 220, through the communication computing module 224, can request the user preferences from the server information handling system 202. The multiple desktop management computing module 212 can retrieve the user preferences from the storage device 210 in response to the request. In other words, the desktop management computing module 220 fetches the user preferences from the server information handling system 202 through the communication computing module 224. The desktop management computing module 220 can receive data indicating the user preferences from the multiple desktop management computing module 212 through the communication computing module 224.

In some examples, the desktop management computing module 220 can store at the storage device 230 the data indicating the user preferences, and the user preferences indicating the desktop GUI configurations. The desktop management computing module 220 can synchronize the desktop GUI configurations with the storage device 230 and with the server information handling system 202, and specifically, the storage device 210. The desktop GUI configurations associated with the user 252 can be synchronized between the client information handling system 204 and the server information handling system 202.

In some examples, the user 250 of the server information handling system 202 is an IT administrator. The user 250 can configure the multiple desktop GUI configurations that can be displayed upon the monitors 206.

The client information handling system 204 can further identify the monitors 206 that are connected/coupled thereto. Specifically, the monitor computing module 259 can identify which of the monitors 206 are currently connected to the client information handling system 204 and a number of the monitors 206 that are currently connected to the client information handling system 204. As illustrated, only the monitors 206*a* and 206*b* are connected to the client information handling system 204; however, any number of monitors 206 can be connected to the client information handling system 204. The monitor computing module 259 can further detect which of the monitors 206 are currently active, or in a powered-on state.

The client information handling system 204 receives user input indicating a selection of the desktop GUI configurations. Specifically, the desktop configuration computing module 222 can provide for display on one or both of the monitors 206 user selectable elements indicating the possible desktop GUI configurations that were previously received. The user 252 can provide input at the client information handling system 204 indicating selection of one or more of the selectable elements corresponding to one or more of the desktop GUI configurations.

In response to the user input, the desktop management computing module 220 can identify, from the storage device 230, the selected desktop GUI configuration. The desktop management computing module 220 can provide data indicating the selected desktop GUI configuration to the desktop configuration computing module 222. The desktop configuration computing module 222 can display the selected desktop GUI configuration on one or both of the monitors 206. Specifically, the desktop management computing module 220 identifies, based on the user preferences of the selected desktop GUI configuration, a particular monitor of the monitors 206 for display of the selected desktop GUI configuration. For example, the desktop management computing module 220 identifies the monitor 206*a* for display of a selected first desktop GUI configuration 260*a* based on the user preferences.

Furthermore, the desktop management computing module 220 identifies, based on the user preferences of the selected first desktop GUI configuration 260*a*, a first subset of computer-executable applications that are associated with the selected first desktop GUI configuration 260*a*. That is, the client information handling system 204 can include or be associated with the plurality of computer-executable applications that can be displayed across a range of desktop GUI configurations. Specifically, the desktop management computing module 220 identifies the computer-executable applications 270 (270*a*, 270*b*, 270*c*, 270*d*) for display within the selected first desktop GUI configuration 260*a* on the monitor 206*a*.

The desktop configuration computing module 222 can receive data from the desktop management computing module 220 indicating the particular monitor 206 for display of the selected desktop GUI configuration and data indicating the first subset of computer-executable applications that are associated with the selected first desktop GUI configuration 260*a*. The desktop configuration computing module 222 can then provide for display the selected desktop GUI configuration on the particular monitor 206, including displaying graphical representations (e.g., icons) of the first subset of the computer-executable applications within the selected first desktop GUI configuration and/or application windows of the first subset of the computer-executable applications within the selected first desktop GUI configuration. For example, the desktop configuration computing module 222 provides for display the selected first desktop GUI configuration 260*a* on the first monitor 206*a*, with the selected first desktop GUI configuration 260*a* including graphical representations of the first subset of the computer-executable applications 270 within the first selected desktop GUI configuration 260*a* and/or application windows of the first subset of the computer-executable applications within the selected first desktop GUI configuration.

In some further implementations, the monitor 206*a* can display the first selected desktop GUI configuration 260*a*, and the monitor 206*b* can display a second selected desktop GUI configuration 260*b*. Specifically, the client information handling system 204 receives additional user input indicating a selection of another desktop GUI configuration. Specifically, the user 252 can provide additional input at the client information handling system 204 indicating selection of the another desktop GUI configuration.

In response to the additional user input, the desktop management computing module 220 can identify, from the storage device 230, a selected second desktop GUI configuration. The desktop management computing module 220 can provide data indicating the selected second desktop GUI configuration to the desktop configuration computing module 222. The desktop configuration computing module 222 can display the selected second desktop GUI configuration on another monitor 206 that isn't currently displaying the first selected desktop GUI configuration 260*a*. Specifically, the desktop management computing module 220 identifies, based on the user preferences of the selected second desktop GUI configuration, a particular monitor of the monitors 206 for display of the selected second desktop GUI configuration. For example, the desktop management computing module 220 identifies the monitor 206*b* for display of a selected second desktop GUI configuration 260*b* based on the user preferences.

Furthermore, the desktop management computing module 220 identifies, based on the user preferences of the selected second desktop GUI configuration 260*b*, a second subset of computer-executable applications that are associated with the selected second desktop GUI configuration 260*b*. The desktop management computing module 220 identifies the computer-executable applications 280 (280*a*, 280*b*, 280*c*, 280*d*) for display within the selected second desktop GUI configuration 260*b* on the monitor 206*b*. In some examples, the first subset of computer-executable applications 270 are distinct from the second subset of computer-executable applications 280. In some examples, the first subset of computer-executable applications 270 overlap, at least partly, with the second subset of computer-executable applications 280.

The desktop configuration computing module 222 can receive data from the desktop management computing module 220 indicating the particular monitor 206 for display of the selected second desktop GUI configuration and data indicating the second subset of computer-executable applications that are associated with the selected second desktop GUI configuration 260*b*. The desktop configuration computing module 222 can then provide for display the selected second desktop GUI configuration on the another monitor 206, including displaying graphical representations (e.g., icons) of the second subset of the computer-executable applications within the selected second desktop GUI configuration and/or application windows of the second subset of the computer-executable applications within the selected second desktop GUI configuration. For example, the desktop configuration computing module 222 provides for display the selected second desktop GUI configuration 260*b* on the second monitor 206*b*, with the selected second desktop GUI configuration 260*b* including graphical representations of the second subset of the computer-executable applications 280 within the second selected desktop GUI configuration 260*b* and/or application windows of the second subset of the computer-executable applications within the selected second desktop GUI configuration.

To that end, multiple desktop GUI configurations can be run/active or be displayed simultaneously by the client information handling system 204. For example, the selected first desktop GUI configuration 260*a* can be displayed upon the monitor 206*a* and the selected second desktop GUI configuration 260*b* can be displayed upon the monitor 206*b* simultaneously/concurrently.

In some examples, the user 252 can provide user input at the client information handling system 204 indicating updates or modification to the first selected desktop GUI configuration 260*a*. For example, the user input can indicate updates of the computer-executable applications 270 that are associated with the first selected desktop GUI configuration 260*a*-adding or removing of the computer-executable applications 270 that are associated with the first selected desktop GUI configuration 260*a* (graphical representations of the computer-executable applications 270 displayed by the first selected desktop GUI configuration 260*a* and/or application windows of the first subset of the computer-executable applications within the selected first desktop GUI configuration 260*a*). The desktop configuration computing module 222 can receive such updates, and provide data indicating such to the desktop management computing module 220. The desktop management computing module 220 can store such updates to the first selected desktop GUI configuration 260*a* at the storage device 230. Furthermore, the desktop management computing module 220 can synchronize such updates to the first selected desktop GUI configuration 260*a* with the server information handling system 202, and the storage device 210 of the server information handling system 202.

In some examples, the user 252 can provide user input at the client information handling system 204 indicating updates or modification to the first selected desktop GUI configuration 260*a*. For example, the user input can indicate an update to the mapping of the first monitor 206*a* for the selected desktop GUI configuration 260*a*. For example, the user input can indicate that the selected first desktop GUI configuration 260*a* is to be mapped to the second monitor 206*b*. For example, the user input can indicate that the selected desktop GUI configuration 260*a* is to be mapped to both the first monitor 206*a* and the second monitor 206*b*. The desktop configuration computing module 222 can receive such updates, and provide data indicating such to the desktop management computing module 220. The desktop management computing module 220 can store such updates to the first selected desktop GUI configuration 260*a* at the storage device 230. Furthermore, the desktop management computing module 220 can synchronize such updates to the first selected desktop GUI configuration 260*a* with the server information handling system 202, and the storage device 210 of the server information handling system 202.

In some examples, the user 252 can provide user input at the client information handling system 204 indicating creation of an additional desktop GUI configuration for the client information handling system 204. Specifically, the user input can indicate a mapping of the additional desktop GUI configuration to one or more of the monitors 206. Further, the user input can identify an additional subset of the computer-executable applications to associate with the additional desktop GUI configuration. The desktop configuration computing module 222 can receive data indicating the creation of the additional desktop GUI configuration, and provide data indicating such to the desktop management computing module 220. The desktop management computing module 220 can store the additional desktop GUI configuration at the storage device 230. Furthermore, the desktop management computing module 220 can synchronize the additional desktop GUI configuration with the server information handling system 202, and the storage device 210 of the server information handling system 202.

In some examples, in response to the user input indicating the creation of the additional desktop GUI configuration, the recommendation computing module 262 can provide recommendations regarding which monitors 206 for mapping of the additional desktop GUI configuration and which computer-executable applications to be associated with the additional desktop GUI configuration. For example, the recommendation computing module 262 can provide such recommendations based on a user profile of the user 252 (stored at the storage device 230 and/or the storage device 210); interaction history of the user 252 with the computer-executable applications (stored at the storage device 230 and/or the storage device 210); interaction history of the user 252 with the monitors 206 (stored at the storage device 230 and/or the storage device 210); and the like. The recommendation computing module 262 can further provide such recommendations based on a currently displayed desktop GUI configuration(s) at the client information handling system 204.

In some examples, an additional monitor 206 can be connected to the client information handling system 204. The monitor computing module 259 can detect a connection of the additional monitor 206. In response to detecting the additional monitor 206, the desktop configuration computing module 222 can provide for display on one or more of the monitors 206 user-selectable elements indicating which desktop GUI configuration to map the additional monitor 206 to. For example, the user-selectable elements can indicate the first desktop GUI configuration 260*a*, the second desktop GUI configuration 260*b*, or another desktop GUI configuration 260. The user 252 can provide input selecting one of the desktop GUI configurations 260 to identify a mapping of the additional monitor 206 to the selected desktop GUI configuration. For example, the user input can indicate that the additional monitor 206 is mapped to the first desktop GUI configuration 260*a*. In some examples, the user input can indicate that the additional monitor 206 is mapped to the first desktop GUI configuration 260*a* such that only the additional monitor 206 displays the first desktop GUI configuration 260*a*. In some examples, the user input can indicate that the additional monitor 206 is mapped to the first desktop GUI configuration 260*a* such that the additional monitor 206 and the first monitor 206*a* both display the first desktop GUI configuration 260*a*. The desktop configuration computing module 222 can receive such updates regarding the mapping of the additional monitor 206 to a particular desktop GUI configuration, and provide data indicating such to the desktop management computing module 220. The desktop management computing module 220 can store such updates regarding the mapping of the additional monitor 206 at the storage device 230. Furthermore, the desktop management computing module 220 can synchronize such updates regarding the mapping of the additional monitor 206 with the server information handling system 202, and the storage device 210 of the server information handling system 202.

In some examples, in response to detection of the additional monitor 206, the recommendation computing module 262 can provide recommendations regarding which additional desktop GUI configurations to map to the additional monitor 206. For example, the recommendation computing module 262 can provide such recommendations based on a user profile of the user 252 (stored at the storage device 230 and/or the storage device 210); interaction history of the user 252 with the computer-executable applications (stored at the storage device 230 and/or the storage device 210); interaction history of the user 252 with the monitors 206 (stored at the storage device 230 and/or the storage device 210); and the like. The recommendation computing module 262 can further provide such recommendations based on a currently displayed desktop GUI configuration(s) at the client information handling system 204.

In some further examples, the first monitor 206*a* can be disconnected from the client information handling system 204. The monitor computing module 259 can detect the disconnection of the first monitor 206*a*. In response to detecting the disconnection of the first monitor 206*a*, the desktop configuration computing module 222 can "move" the first desktop GUI configuration 260*a* from the first monitor 206*a* to the second monitor 206*b*. In some examples, when the second monitor 206*b* concurrently includes the second desktop GUI configuration 260*b* when the first monitor 206*a* is disconnected, the desktop configuration computing module 222 provides for display on the second monitor 206*b* user-selectable elements for the user to select indicating which desktop GUI configuration would have priority for display upon the second monitor 206*b*. The desktop configuration computing module 222 receives user input indicating which desktop GUI configuration would have priority, and updates the second monitor 206*b* accordingly.

In some further examples, when the first monitor 206*a* is displaying the first desktop GUI configuration 260*a* and the second monitor 206*b* is displaying the second desktop GUI configuration 260*b*, the desktop configuration computing module 222 receives user input indicating for the second monitor 206*b* to stop displaying the second desktop GUI configuration 260*b*. In response to receiving such input, the recommendation computing module 262 can provide recommendations of mapping the first desktop GUI configuration 260*a* additionally to the second monitor 206*b* as well as the first monitor 206*a*. For example, the recommendation computing module 262 can provide such recommendations based on a user profile of the user 252 (stored at the storage device 230 and/or the storage device 210); interaction history of the user 252 with the computer-executable applications (stored at the storage device 230 and/or the storage device 210); interaction history of the user 252 with the monitors 206 (stored at the storage device 230 and/or the storage device 210); and the like. The recommendation computing module 262 can further provide such recommendations based on a currently displayed desktop GUI configuration(s) at the client information handling system 204.

In some further examples, when the first monitor 206*a* is displaying the first desktop GUI configuration 260*a* and the second monitor 206*b* is displaying the second desktop GUI configuration 260*b*, and the desktop configuration computing module 222 receives input indicating launch of a new computer-executable application, the desktop management computing module 220 can identify which desktop GUI configuration the computer-application is associated with (e.g., from the user preferences stored in the storage device 230). The desktop configuration computing module 222 can then update the appropriate desktop GUI configuration appropriately. In some examples, when the new computer-executable application is associated with multiple desktop GUI configurations (both the first desktop GUI configuration 260*a* and the second desktop GUI configuration 260*b*), the desktop configuration computing module 222 can then update each desktop GUI configuration (currently being implemented) with the computer-executable application (e.g., both the first desktop GUI configuration 260*a* and the second desktop GUI configuration 260*b*).

Figure 3:
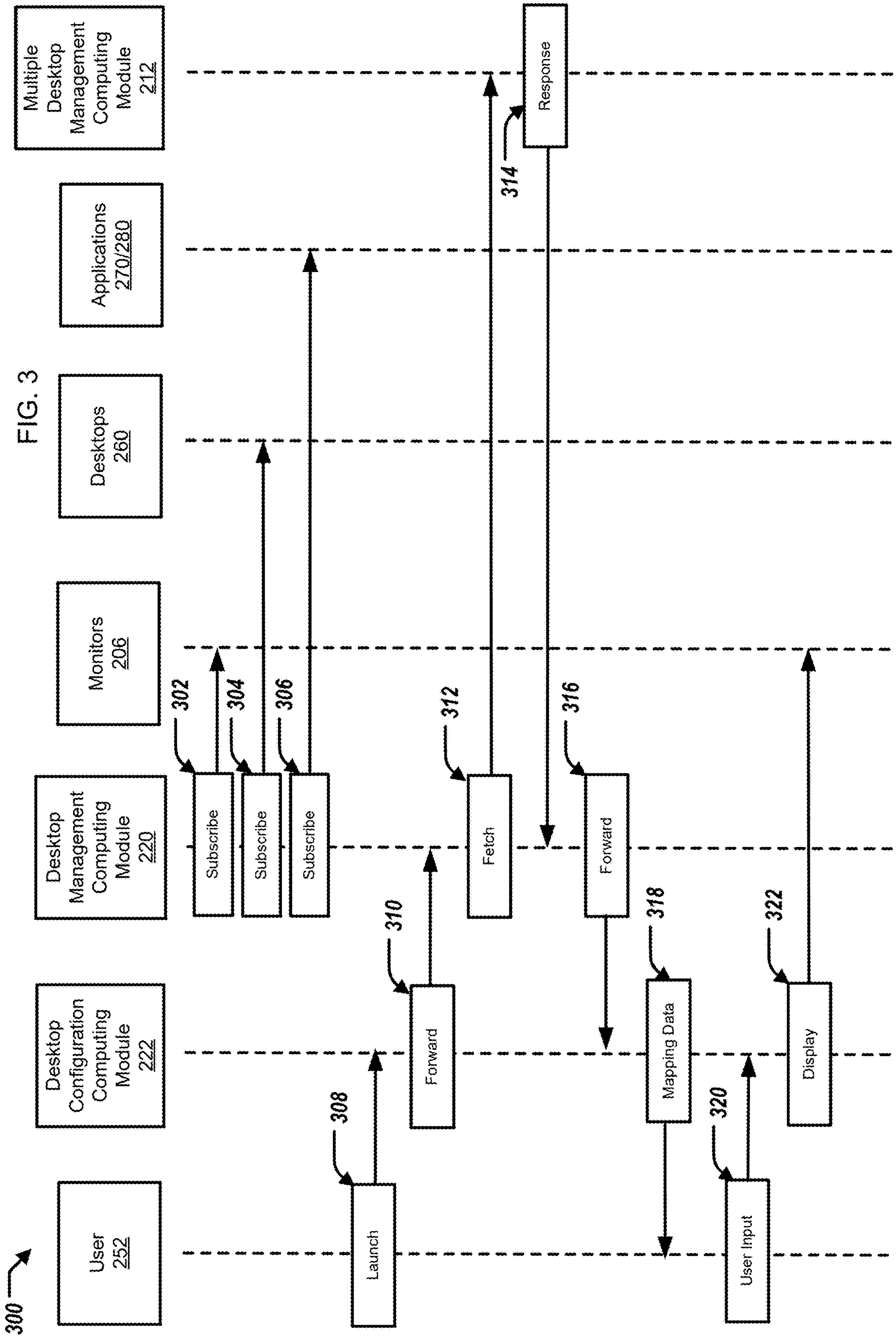
FIGS. 3-11 illustrate respective swim-lane diagrams for managing desktops at an information handling system.

FIG. 3 illustrates a swim-lane diagram depicting selected elements of an embodiment of a method 300 for managing resources of a docking station. The method 300 may be performed by the information handling system 100, the server information handling system 202, and/or the client information handling system 204, and with reference to FIGS. 1-2. It is noted that certain operations described in method 300 may be optional or may be rearranged in different embodiments.

The desktop management computing module 220 can subscribe to updates/events (connection/disconnection status) from the monitors 206, at 302. The desktop management computing module 220 can subscribe to updates/events to the desktop GUI configurations 260 (creation/deletion/modification), at 304. The desktop management computing module 220 can subscribe to updates/events from the applications 270/280 (inclusion or deletion from desktop GUI configurations), at 306. The user 252 can provide input indicating system startup/launch of the client information handling system 204, at 308. The desktop configuration computing module 222 can forward data indicating such startup/launch to the desktop management computing module 220, at 310. The desktop management computing module 220 can fetch the user preferences indicating the desktop GUI configurations, at 312. The multiple desktop management computing module 212 can provide a response including data indicating the user preferences to the desktop management computing module 220, at 314. The desktop management computing 220 can forward such to the desktop configuration computing module 222, at 316. The desktop configuration computing module 222 can provide to the user 252 (e.g., via the monitors 206) the options of the possible desktop GUI configurations, at 318. The user 252 can provide input indicating a selected desktop GUI configuration, at 320. The desktop configuration computing module 222 can display the selected desktop GUI configuration upon the appropriate monitor(s) 206, at 322.

Figure 4:
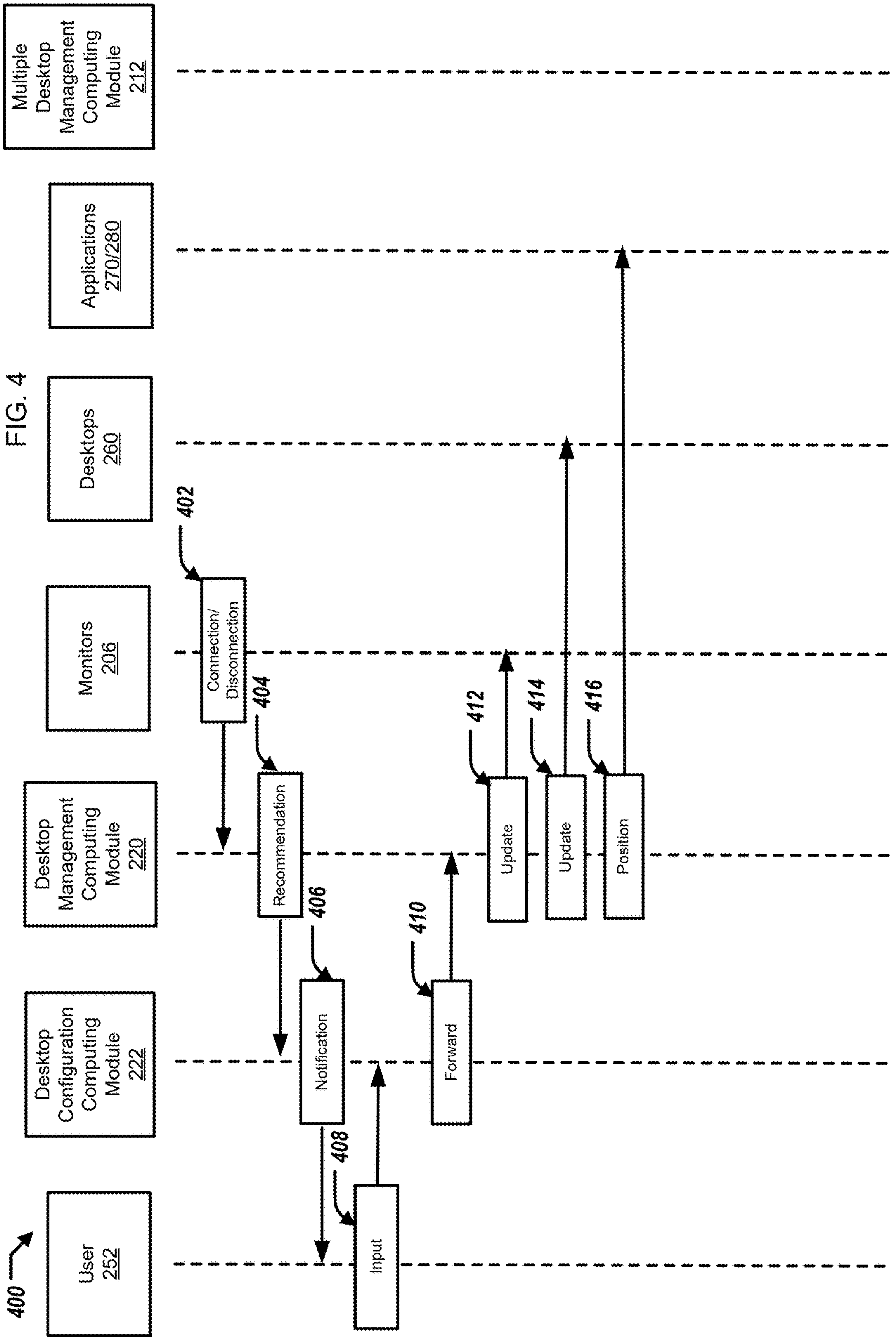

FIG. 4 illustrates a swim-lane diagram depicting selected elements of an embodiment of a method 400 for managing desktops at an information handling system. The method 400 may be performed by the information handling system 100, the server information handling system 202, and/or the client information handling system 204, and with reference to FIGS. 1-2. It is noted that certain operations described in method 400 may be optional or may be rearranged in different embodiments.

The monitor computing module 259 of the desktop management computing module 220 detects a connection or disconnection of a monitor 206, at 402. The recommendation computing module 262 of the desktop management computing module 220 provides a mapping recommendation of the currently displayed desktop GUI configurations and the currently connected monitors 206, at 404. The desktop configuration computing module 222 provides a notification (e.g., via the currently connected monitors 206) regarding the recommendation to the user 252, at 406. The user 252 provides user input (mapping request) indicating the selected desktop GUI configuration(s) for display on the currently connected monitors 206, at 408. The desktop configuration computing module 222 forwards the mapping request to the desktop configuration computing module 222, at 410. The desktop management computing module 220 updates the monitors 206, at 412, with the currently displayed desktop GUI configuration(s), at 414, based on the mapping request. The desktop management computing module 220 updates the currently displayed desktop GUI configuration(s) displayed on the appropriate monitors 206 with appropriate positioning of the computer-executable applications, at 416.

Figure 5:
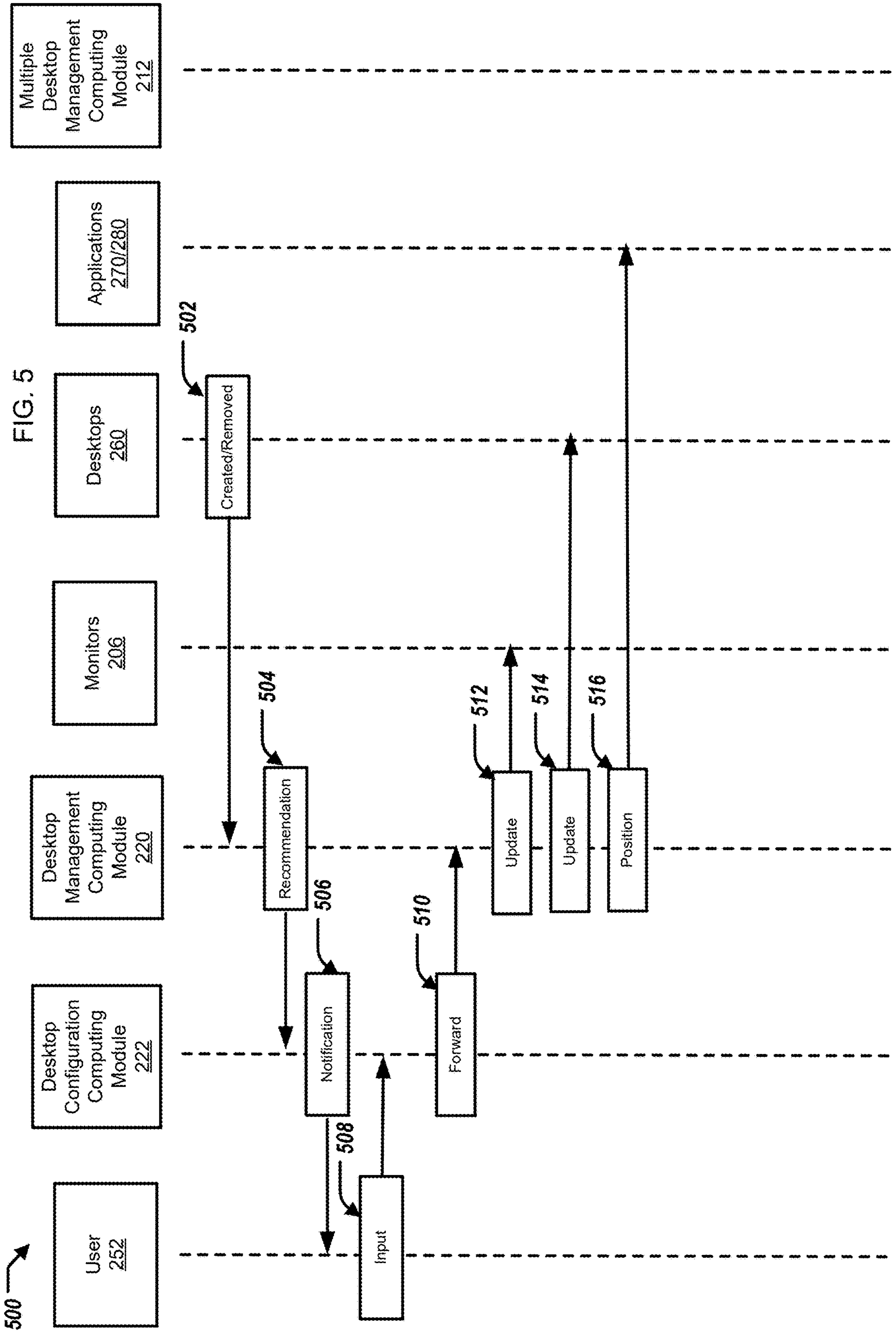

FIG. 5 illustrates a swim-lane diagram depicting selected elements of an embodiment of a method 500 for managing desktops at an information handling system. The method 500 may be performed by the information handling system 100, the server information handling system 202, and/or the client information handling system 204, and with reference to FIGS. 1-2. It is noted that certain operations described in method 500 may be optional or may be rearranged in different embodiments.

The desktop management computing module 220 detects a creation or removal of a desktop GUI configuration 260, at 502. The recommendation computing module 262 of the desktop management computing module 220 provides a mapping recommendation of the currently displayed desktop GUI configurations/created desktop GUI configuration and the currently connected monitors 206, at 504. The desktop configuration computing module 222 provides a notification (e.g., via the currently connected monitors 206) regarding the recommendation to the user 252, at 506. The user 252 provides user input (mapping request) indicating selected desktop GUI configuration(s) for display on the currently connected monitors 206, at 508. The desktop configuration computing module 222 forwards the mapping request to the desktop configuration computing module 222, at 510. The desktop management computing module 220 updates the monitors 206, at 512, with the currently displayed desktop GUI configuration(s), at 514, based on the mapping request. The desktop management computing module 220 updates the currently displayed desktop GUI configuration(s) displayed on the appropriate monitors 206 with appropriate positioning of the computer-executable applications, at 516.

Figure 6:
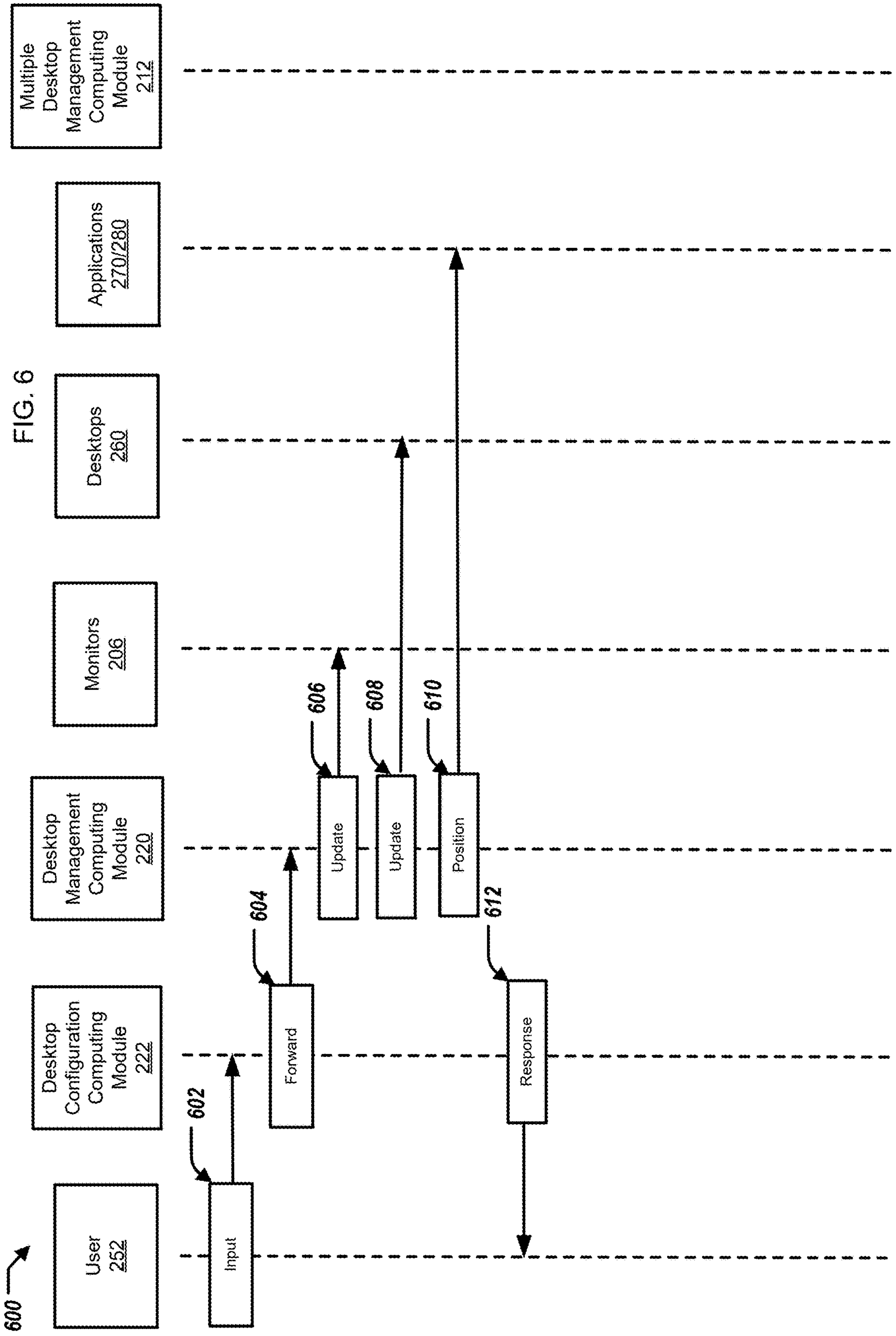

FIG. 6 illustrates a swim-lane diagram depicting selected elements of an embodiment of a method 600 for managing desktops at an information handling system. The method 600 may be performed by the information handling system 100, the server information handling system 202, and/or the client information handling system 204, and with reference to FIGS. 1-2. It is noted that certain operations described in method 600 may be optional or may be rearranged in different embodiments.

The user 252 provides user input indicating a mapping change, at 602. The desktop configuration computing module 222 can forward such changes to the desktop management computing module 220, at 604. The desktop management computing module 220 updates the mapping of the monitors and the desktop GUI configurations, at 606, based on the mapping change. The desktop management computing module 220 updates the desktop GUI configurations, at 608, based on the mapping change. The desktop management computing module 220 updates the desktop GUI configuration displayed on the monitors 206 with appropriate positioning of the computer-executable applications, at 610. The desktop configuration computing module 222 provides a response to the user 252 indicating configuration of the mapping change, at 612, e.g., via the monitors 206.

Figure 7:
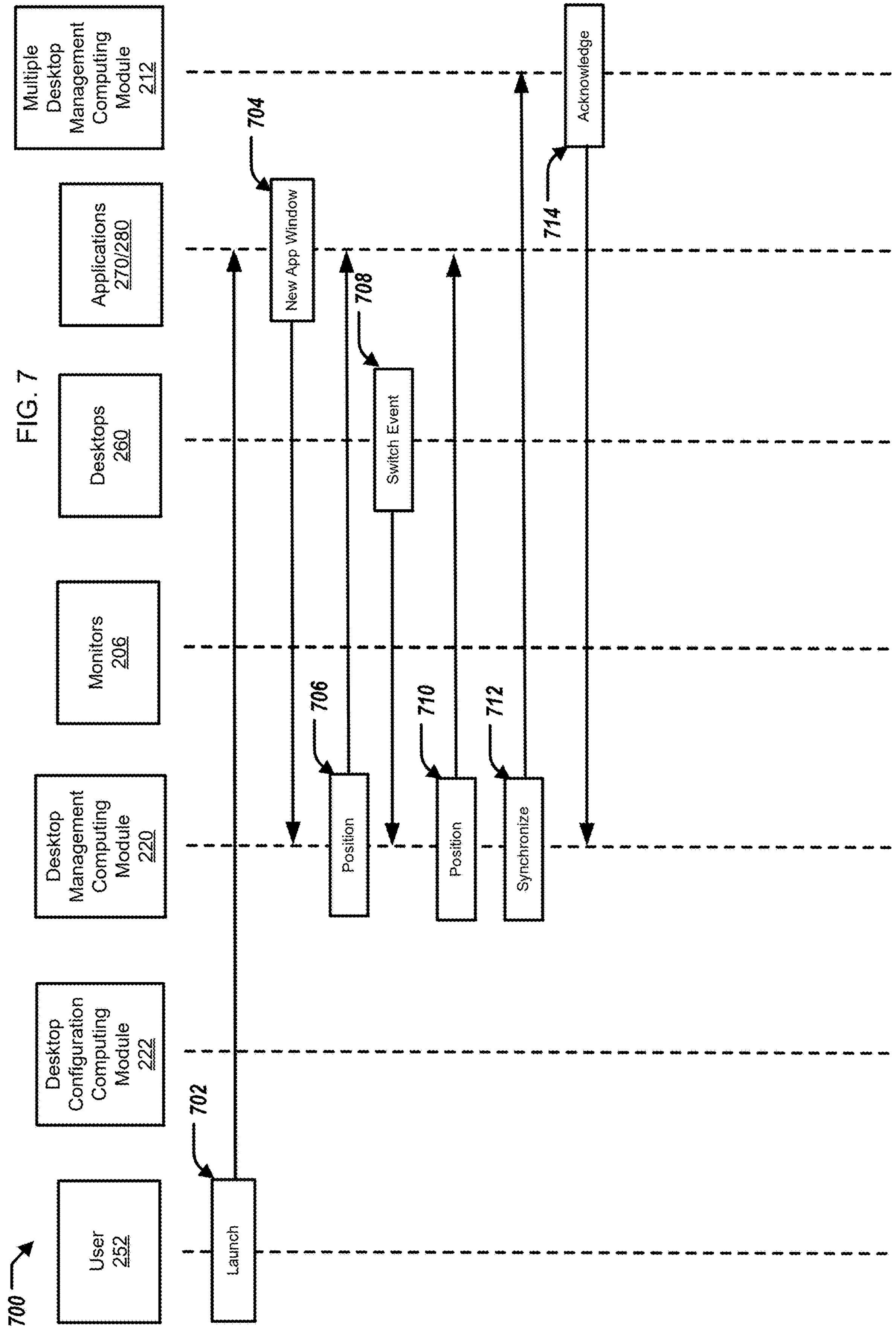

FIG. 7 illustrates a swim-lane diagram depicting selected elements of an embodiment of a method 700 for managing desktops at an information handling system. The method 700 may be performed by the information handling system 100, the server information handling system 202, and/or the client information handling system 204, and with reference to FIGS. 1-2. It is noted that certain operations described in method 700 may be optional or may be rearranged in different embodiments.

The user 252 launches a computer-executable application, at 702. An application window corresponding to the launched computer-executable application is launched, at 704. The desktop management computing module 220 positions the application window within the currently displayed desktop GUI configuration, at 706. The currently displayed desktop GUI configuration is switched to a new desktop GUI configuration, at 708. The desktop management computing module 220 positions the application window within the new desktop GUI configuration, at 710. The desktop management computing module 220 synchronizes the new desktop GUI configuration with the multiple desktop management computing module 212, at 712. The multiple desktop management computing module 212 provides an acknowledgement to the desktop management computing module 220, at 714.

Referring back to FIG. 2, in some examples, the user 250 can provide further user input indicating settings of the desktop GUI configurations at the server information handling system 202. The multiple desktop management computing module 212 can receive such input regarding a specific subset of computer-executable applications that are allowed for the user 252 and the client information handling system 204. More specifically, the settings of the desktop GUI configurations can indicate which computer-executable applications are allowed for which desktop GUI configurations. In the current example, the settings can indicate that the computer-executable applications 270 are allowed for the desktop GUI configuration 260*a* and the computer-executable applications 280 are allowed for the desktop GUI configuration 260*b*. The multiple desktop management computing module 212 can store such settings at the storage device 210.

The desktop management computing module 220 can fetch such settings from the multiple desktop management computing module 212 of the server information handling system 202 and from the storage device 210 through the communication computing module 224. The desktop management computing module 220 can store the settings at the storage device 230, and synchronizes the settings between the storage device 230 and the storage device 210 of the server information handling system 202.

The hook driver computing module 226 can detect launch of a new computer-executable application within a desktop GUI configuration. For example, the hook driver computing module 226 detects launch of a new computer-executable application within the desktop GUI configuration 260*a*.

The hook driver computing module 226 can determine whether the new computer-executable application is allowed for the desktop GUI configuration. For example, the hook driver computing module 226 can determine whether the new computer-executable application is allowed for the desktop GUI configuration 260*a*. Specifically, the hook driver computing module 226 informs the desktop management computing module 220 about the launch of the new computer-executable application. For example, the hook driver computing module 226 can provide such details as application name, process identifier (PID), parent process identifier (PPID), and the like to the desktop management computing module 220. The desktop management computing module 220 accesses the settings for the desktop GUI configuration 260*a* stored at the storage device 230 to determine whether the new computer-executable application is allowed/configured for the desktop GUI configuration 260*a*.

In some examples, the desktop management computing module 220 accesses the settings for the desktop GUI configuration 260*a* stored at the storage device 230 and determines that the new computer-executable application is allowed/configured for the desktop GUI configuration 260*a*. The desktop management computing module 220 instructs the hook driver computing module 226 that the new computer-executable application is allowed. The hook driver computing module 226 then allows the new computer-executable application to start/launch.

In some examples, the desktop management computing module 220 accesses the settings for the desktop GUI configuration 260*a* stored at the storage device 230 and determines that the new computer-executable application is not allowed/configured for the desktop GUI configuration 260*a*. The desktop management computing module 220 instructs the hook driver computing module 226 that the new computer-executable application is not allowed. The hook driver computing module 226 then blocks the new computer-executable application from starting/launching.

In some examples, when a window handle is not associated with the new computer-executable application or is not available, the hook driver computing module 226 can identify a parent process of the new computer-executable application to identify details of the window of the parent process. The hook driver computing module 226 can provide these details to the desktop management computing module 220 for determination of whether the new computer-executable application is allowed for the desktop GUI configuration 260*a*.

In some further examples, the user 250 can provide further user input indicating settings of the desktop GUI configurations at the server information handling system 202. The multiple desktop management computing module 212 can receive such input regarding external devices 290 that are allowed for the user 252 and the client information handling system 204. More specifically, the settings of the desktop GUI configurations can indicate which external devices 290 are allowed for which desktop GUI configurations. In the current example, the settings can indicate that a subset of the devices 290 are allowed for the desktop GUI configuration 260*a*. The multiple desktop management computing module 212 can store such settings at the storage device 210.

The desktop management computing module 220 can fetch such settings from the multiple desktop management computing module 212 of the server information handling system 202 and from the storage device 210 through the communication computing module 224. The desktop management computing module 220 can store the settings at the storage device 230, and synchronizes the settings between the storage device 230 and the storage device 210 of the server information handling system 202.

The hook driver computing module 228 can detect connection of an external device 290 with the client information handling system 204. For example, the hook driver computing module 228 detects connection of the external device 290 with the client information handling system 204 while the desktop GUI configuration 260*a* is currently being displayed/utilized.

The hook driver computing module 228 can determine whether the external device 290 is allowed for the currently displayed desktop GUI configuration. For example, the hook driver computing module 228 can determine whether the external device 290 is allowed for the desktop GUI configuration 260*a*. Specifically, the hook driver computing module 228 informs the desktop management computing module 220 about the connection of the external device 290. The desktop management computing module 220 accesses the settings for the desktop GUI configuration 260*a* stored at the storage device 230 to determine whether the external device 290 is allowed/configured for the desktop GUI configuration 260*a*.

In some examples, the desktop management computing module 220 accesses the settings for the desktop GUI configuration 260*a* stored at the storage device 230 and determines that the external device 290 is allowed/configured for the desktop GUI configuration 260*a*. The desktop management computing module 220 instructs the hook driver computing module 228 that the connection of the external device 290 for use within the desktop GUI configuration 260*a* is allowed. The hook driver computing module 228 then allows the external device 290 for use within the desktop GUI configuration 260*a*.

In some examples, the desktop management computing module 220 accesses the settings for the desktop GUI configuration 260*a* stored at the storage device 230 and determines that the external device 290 is not allowed/configured for the desktop GUI configuration 260*a*. The desktop management computing module 220 instructs the hook driver computing module 228 that the connection of the external device 290 for use within the desktop GUI configuration 260*a* is not allowed. The hook driver computing module 228 then blocks the new computer-executable application from starting/launching.

In some examples, the hook driver computing module 226 can also inject an "application hook DLL" into each computer-executable application to restrict access to resources of the client information handling system 204 such as a clipboard and devices. The hook driver computing module 226 hooks IAT/EAT APIs for devices and a clipboard. When a computer-executable application is launched, the application hook DLL of the application will hook the IAT/EAT APIs for the clipboard. When a copy/paste function is attempted to be implemented by the user 252 associated with a computer-implemented application, the application hook DLL checks the source and destination of the computer-implemented application that is allowed within the currently displayed GUI configuration. The clipboard functionality is only allowed for computer-implemented applications allowed inside the currently displayed GUI configuration.

Figure 8:
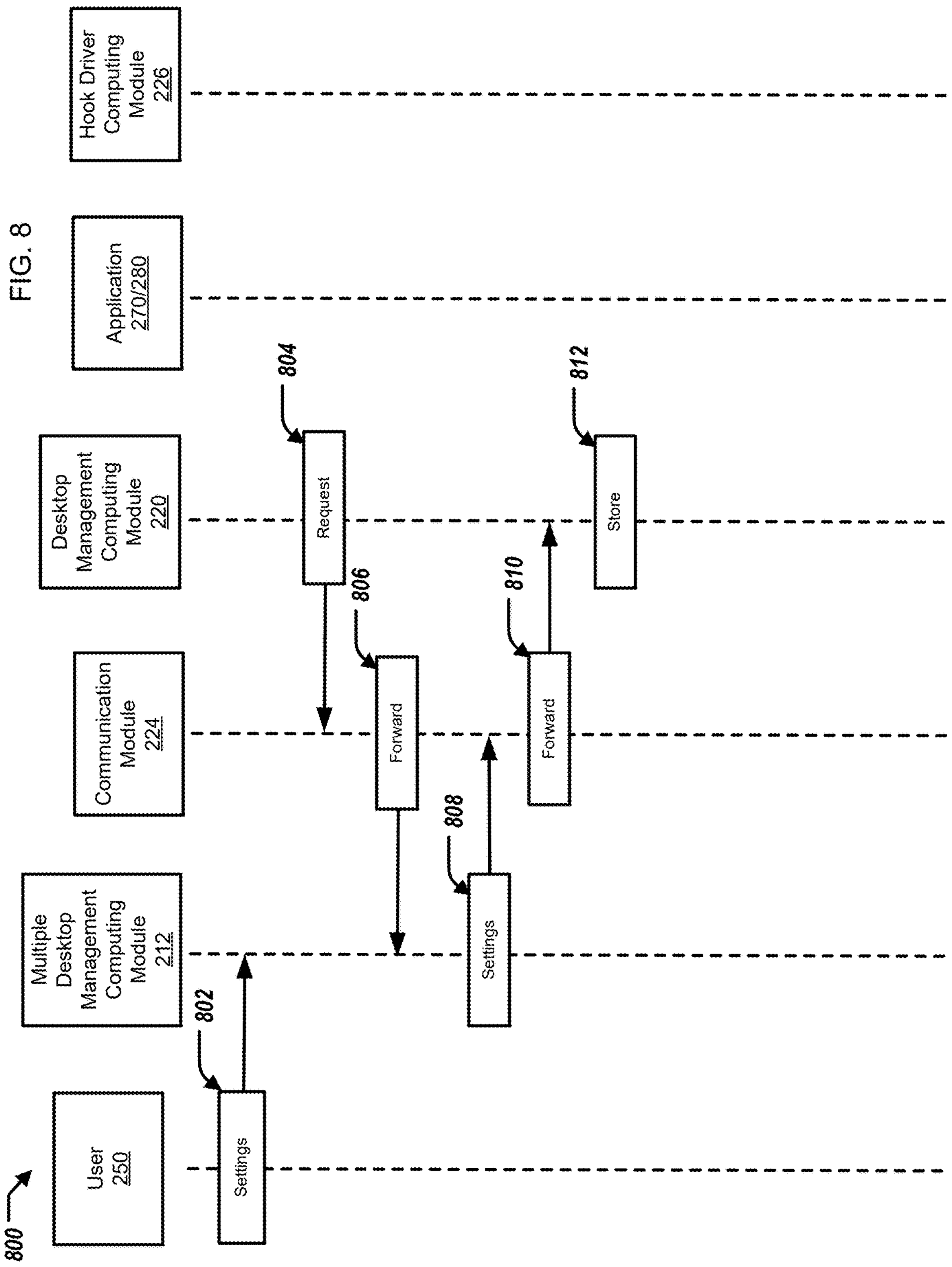

FIG. 8 illustrates a swim-lane diagram depicting selected elements of an embodiment of a method 800 for managing desktops at an information handling system. The method 800 may be performed by the information handling system 100, the server information handling system 202, and/or the client information handling system 204, and with reference to FIGS. 1-2. It is noted that certain operations described in method 800 may be optional or may be rearranged in different embodiments.

The user 250 provides user input including settings information for the desktop GUI configurations to the multiple desktop management computing module 212 for storage at the storage device 210, including allowed and blocked applications for each desktop GUI configuration, at 802. The desktop management computing module 220 requests the settings information, at 804. The communication computing module 224 forwards the request, at 806. The multiple desktop management computing module 212 provides the settings for the desktop GUI configurations, at 808. The communication computing module 224 forwards the settings, at 810. The desktop management computing module 220 stores the settings at the storage device 230, at 812.

Figure 9:
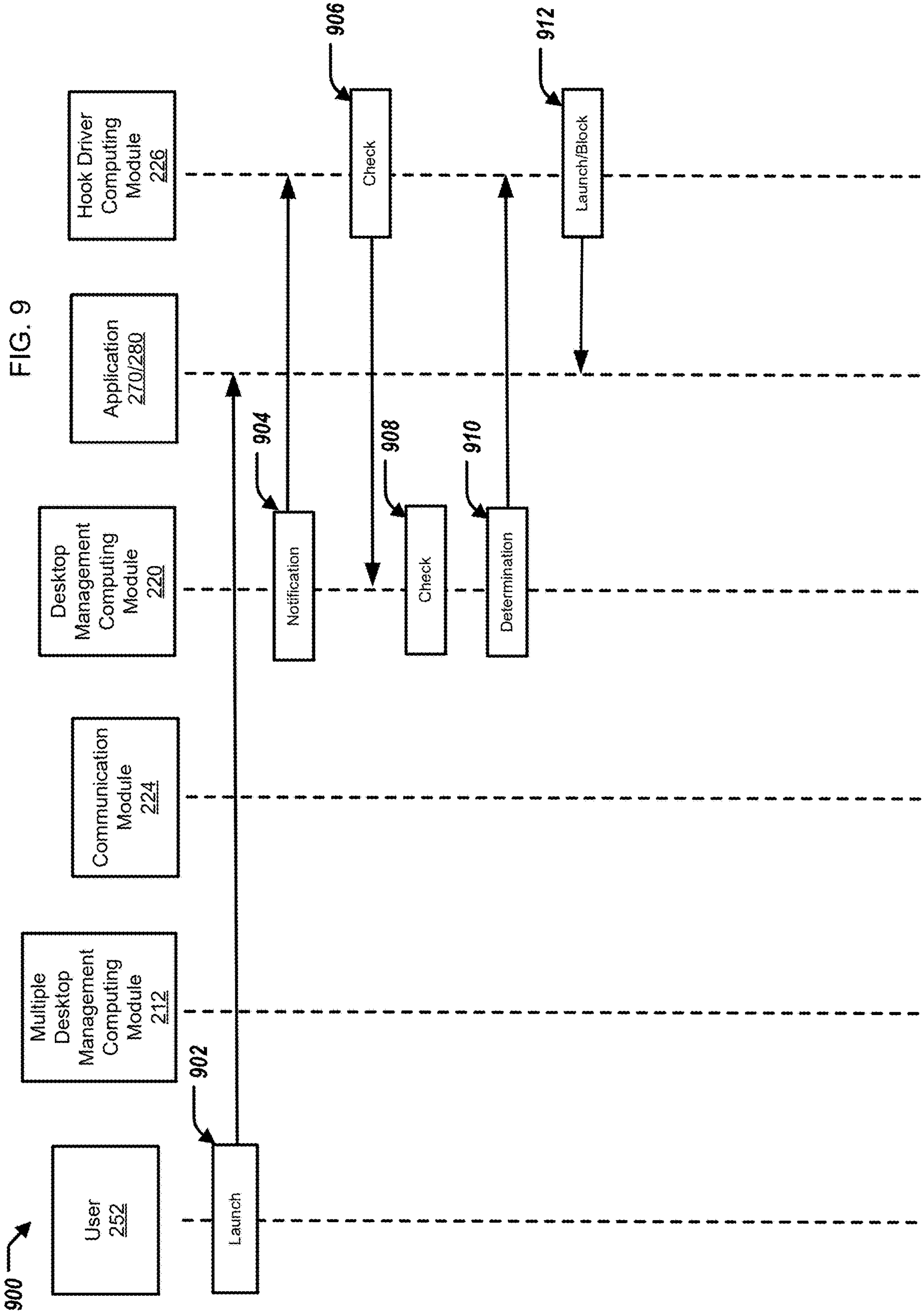

FIG. 9 illustrates a swim-lane diagram depicting selected elements of an embodiment of a method 900 for managing desktops at an information handling system. The method 900 may be performed by the information handling system 100, the server information handling system 202, and/or the client information handling system 204, and with reference to FIGS. 1-2. It is noted that certain operations described in method 900 may be optional or may be rearranged in different embodiments.

The user 252 launches an application, at 902. The desktop management computing module 220 notifies the hook driver computing module 226 of such application, at 904. The hook driver computing module 226 checks with the desktop management computing module 220 for allowability of the launch of the application with respect to a particular desktop GUI configuration, at 906. The desktop management computing module 220 checks whether the application is able to launch for the particular desktop GUI configuration based on the settings, at 908. The desktop management computing module 220 provides results of such determination to the hook driver computing module 226, at 910. The hook driver computing module 226 allows launch or blocks the application, based on the provided results, at 912.

Figure 10:
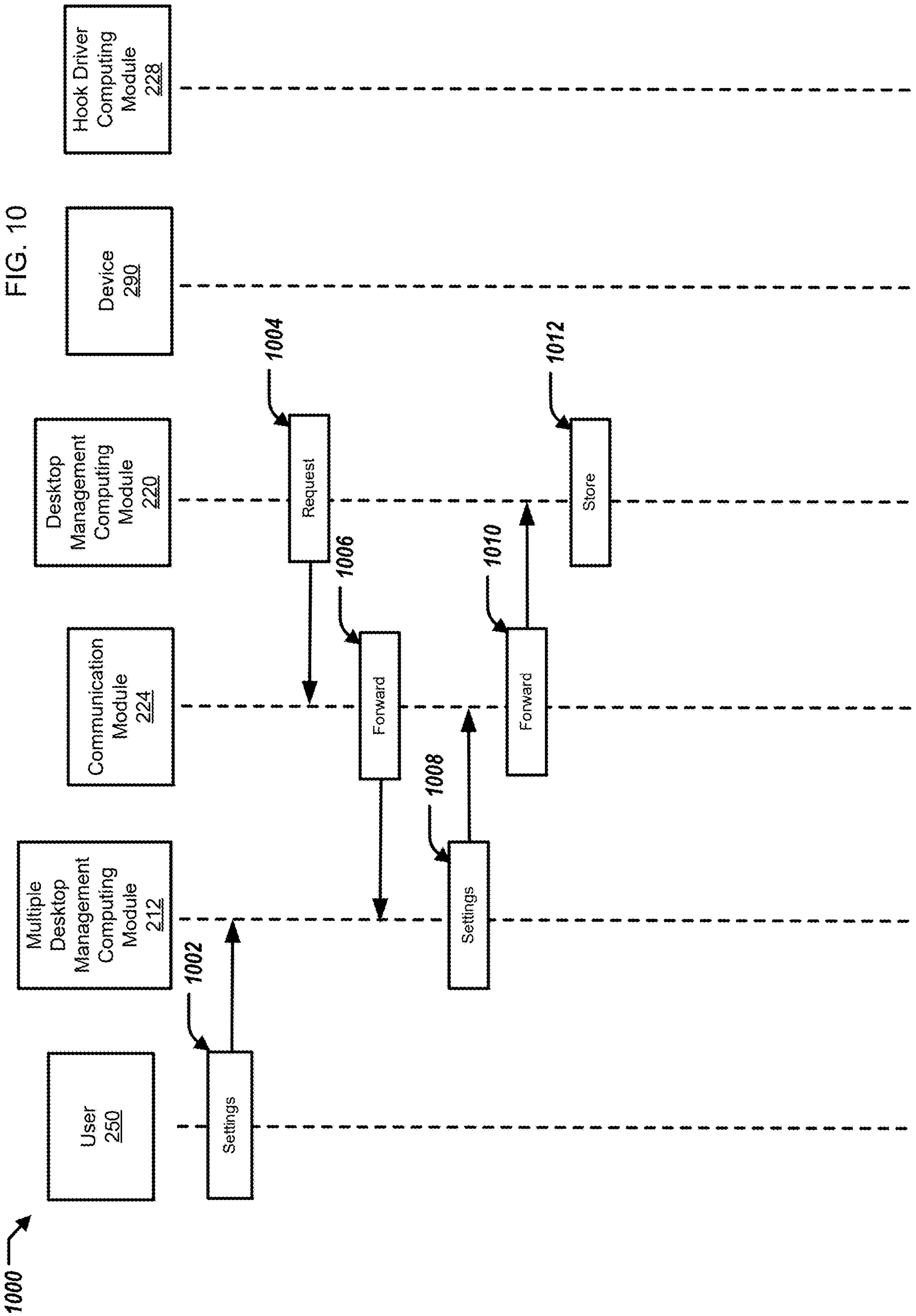

FIG. 10 illustrates a swim-lane diagram depicting selected elements of an embodiment of a method 1000 for managing desktops at an information handling system. The method 1000 may be performed by the information handling system 100, the server information handling system 202, and/or the client information handling system 204, and with reference to FIGS. 1-2. It is noted that certain operations described in method 1000 may be optional or may be rearranged in different embodiments.

The user 250 provides user input including settings information for the desktop GUI configurations to the multiple desktop management computing module 212 for storage at the storage device 210, including allowed and blocked access to external devices for each desktop GUI configuration, at 1002. The desktop management computing module 220 requests the settings information, at 1004. The communication computing module 224 forwards the request, at 1006. The multiple desktop management computing module 212 provides the settings for the desktop GUI configurations, at 1008. The communication computing module 224 forwards the settings, at 1010. The desktop management computing module 220 stores the settings at the storage device 230, at 1012.

Figure 11:
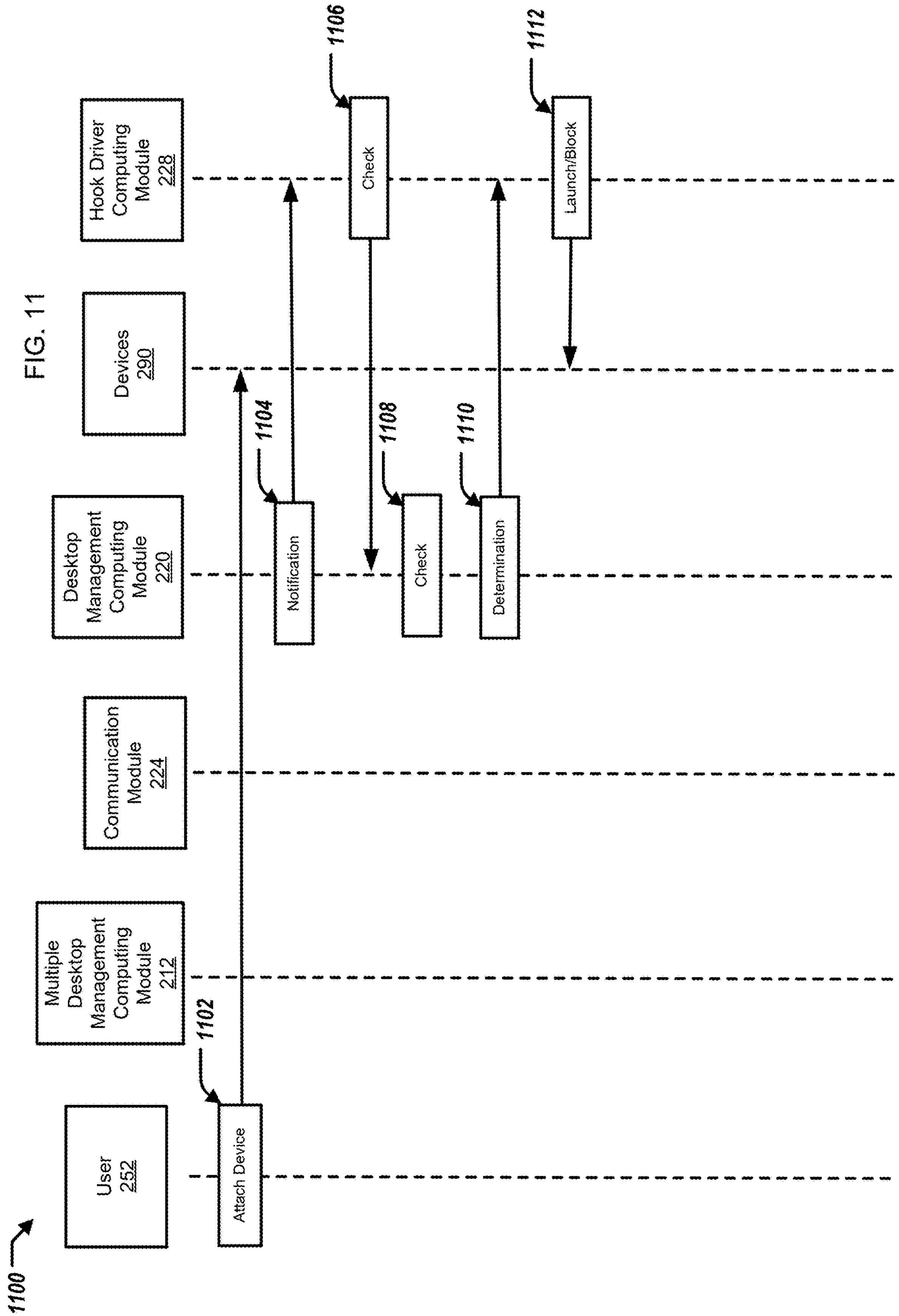

FIG. 11 illustrates a swim-lane diagram depicting selected elements of an embodiment of a method 1100 for managing desktops at an information handling system. The method 1100 may be performed by the information handling system 100, the server information handling system 202, and/or the client information handling system 204, and with reference to FIGS. 1-2. It is noted that certain operations described in method 1100 may be optional or may be rearranged in different embodiments.

The user 252 attaches/couples an external device 290 to the client information handling system 204, at 1102. The desktop management computing module 220 notifies the hook driver computing module 228 of such external device 290, at 1104. The hook driver computing module 228 checks with the desktop management computing module 220 for allowability of the external device 290 with respect to a particular desktop GUI configuration, at 1106. The desktop management computing module 220 checks whether the external device 290 is able to be used for a particular desktop GUI configuration based on the settings, at 1108. The desktop management computing module 220 provides results of such determination to the hook driver computing module 228, at 1110. The hook driver computing module 228 allows launch of or blocks the external device 290, based on the provided results, at 1112.

Figure 12:
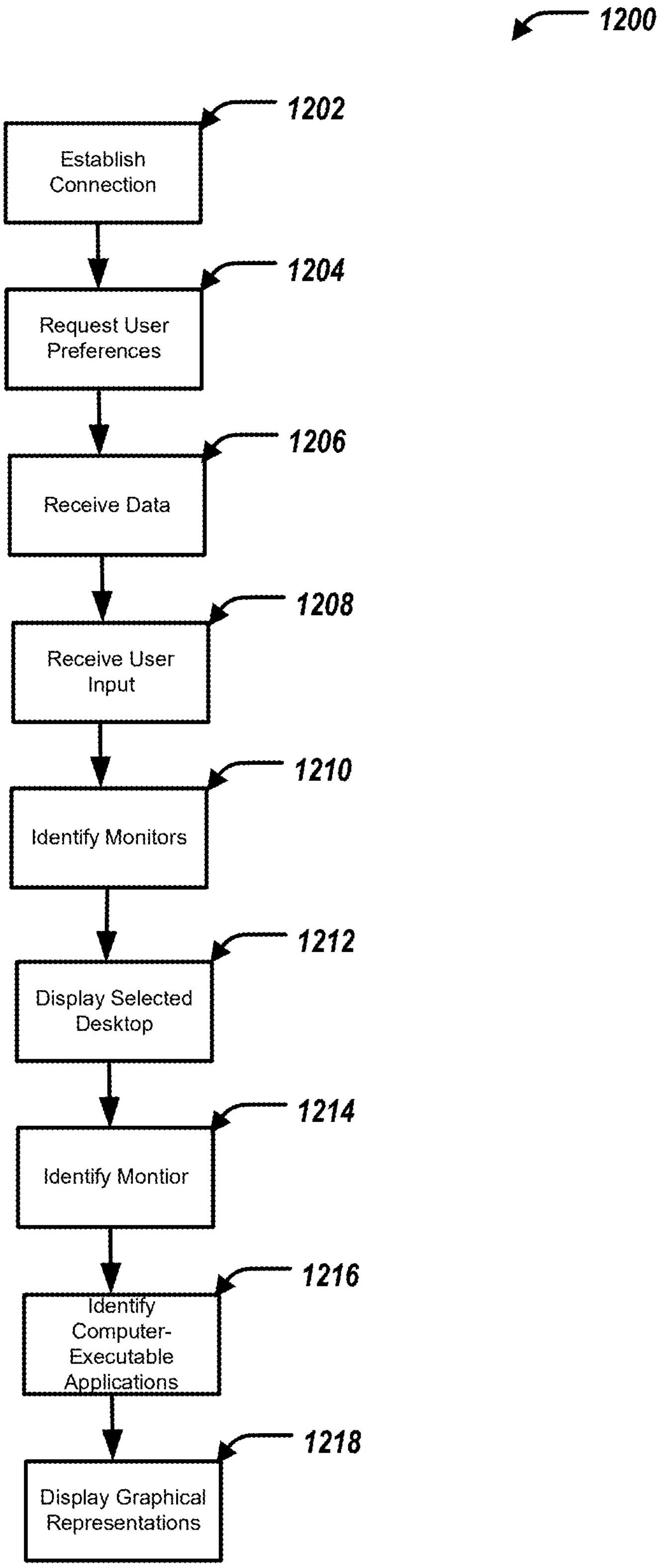
FIG. 12 illustrates a method for managing desktops at an information handling system.

FIG. 12 illustrates a flowchart depicting selected elements of an embodiment of a method 1200 for managing desktops at an information handling system. The method 1200 may be performed by the information handling system 100, the server information handling system 202, and/or the client information handling system 204, and with reference to FIGS. 1-2. It is noted that certain operations described in method 1200 may be optional or may be rearranged in different embodiments.

The client information handling system 204 establishes a connection with the server information handling system 202, at 1202. The desktop management computing module 220, through the communication computing module 224, can request the user preferences from the server information handling system 202, at 1204. The desktop management computing module 220 can receive data indicating the user preferences from the multiple desktop management computing module 212 through the communication computing module 224, at 1206. The client information handling system 204 receives user input indicating a selection of the desktop GUI configurations, at 1208. The client information handling system 204 can further identify the monitors 206 that are connected/coupled thereto, at 1210. The desktop configuration computing module 222 can display the selected desktop GUI configuration, at 1212. The desktop management computing module 220 identifies, based on the user preferences of the selected desktop GUI configuration, a particular monitor of the monitors 206 for display of the selected desktop GUI configuration, at 1214. The desktop management computing module 220 identifies, based on the user preferences of the selected desktop GUI configuration, a subset of computer-executable applications that are associated with the selected desktop GUI configuration, at 1216. The desktop configuration computing module 222 can provide for display the selected desktop GUI configuration on the particular monitor 206, including displaying graphical representations of the first subset of the computer-executable applications within the selected desktop GUI configuration and/or application windows of the first subset of the computer-executable applications within the selected desktop GUI configuration, at 1218.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method of managing desktops at an information handling system, the method comprising:

establishing a connection between a client information handling system (IHS) and a server IHS;

requesting, by the client IHS and to the server IHS, user preferences associated with the client IHS and the user, the user preferences indicating two or more desktop graphical user interface (GUI) configurations;

receiving, by the client IHS and from the server IHS, data indicating the user preferences;

receiving, by the client IHS, user input indicating a selection of one of the desktop GUI configurations;

displaying the selected desktop GUI configuration, including:

identifying, based on the user preferences, one or more monitors connected to the client IHS for displaying the selected desktop GUI configuration;

identifying, based on the user preferences, a first subset of computer-executable applications, of a plurality of computer-executable applications, associated with the selected desktop GUI configuration; and displaying the selected desktop GUI configuration on the first monitor, including displaying a graphical representation of the first subset of the computer-executable applications within the selected desktop GUI configuration.

2. The computer-implemented method of claim 1, further including:

identifying creation of an additional desktop GUI configuration at the client information handling system, including:

identifying a mapping of the additional desktop GUI configuration to one or more of the monitors; and identifying a second subset of the computer-executable applications associated with the additional desktop GUI configuration.

3. The computer-implemented method of claim 1, further including:

detecting an additional monitor connected with the client IHS, and in response:

identifying a mapping of the additional monitor for the selected desktop GUI configuration.

4. The computer-implemented method of claim 1, further including:

updating the selected desktop GUI configuration, including updating a mapping of the monitors; and synchronizing the updates with the server IHS.

5. The computer-implemented method of claim 1, further including:

detecting launch of a new computer-executable application within the selected desktop GUI configuration;

determining that the new computer-executable application is not allowed for the selected desktop GUI configuration; and blocking launch of the new computer-executable application for the selected desktop GUI configuration.

6. The computer-implemented method of claim 1, further including:

detecting connection of an external device to the client information handling system within the selected desktop GUI configuration;

determining that the external device is not allowed for the selected desktop GUI configuration; and blocking connection of the external device for the selected desktop GUI configuration.

7. An information handling system comprising a processor having access to memory media storing instructions executable by the processor to perform operations, comprising:

establishing a connection between a client information handling system (IHS) and a server IHS;

requesting, by the client IHS and to the server IHS, user preferences associated with the client IHS and the user, the user preferences indicating two or more desktop graphical user interface (GUI) configurations;

receiving, by the client IHS and from the server IHS, data indicating the user preferences;

receiving, by the client IHS, user input indicating a selection of one of the desktop GUI configurations;

displaying the selected desktop GUI configuration, including:

identifying, based on the user preferences, one or more monitors connected to the client IHS for displaying the selected desktop GUI configuration;

identifying, based on the user preferences, a first subset of computer-executable applications, of a plurality of computer-executable applications, associated with the selected desktop GUI configuration; and displaying the selected desktop GUI configuration on the first monitor, including displaying a graphical representation of the first subset of the computer-executable applications within the selected desktop GUI configuration.

8. The information handling system of claim 7, the operations further including:

identifying creation of an additional desktop GUI configuration at the client information handling system, including:

identifying a mapping of the additional desktop GUI configuration to one or more of the monitors; and identifying a second subset of the computer-executable applications associated with the additional desktop GUI configuration.

9. The information handling system of claim 7, the operations further including:

detecting an additional monitor connected with the client IHS, and in response:

identifying a mapping of the additional monitor for the selected desktop GUI configuration.

10. The information handling system of claim 7, the operations further including:

updating the selected desktop GUI configuration, including updating a mapping of the monitors; and synchronizing the updates with the server IHS.

11. The information handling system of claim 7, the operations further including:

detecting launch of a new computer-executable application within the selected desktop GUI configuration;

determining that the new computer-executable application is not allowed for the selected desktop GUI configuration; and blocking launch of the new computer-executable application for the selected desktop GUI configuration.

12. The information handling system of claim 7, the operations further including:

detecting connection of an external device to the client information handling system within the selected desktop GUI configuration;

determining that the external device is not allowed for the selected desktop GUI configuration; and blocking connection of the external device for the selected desktop GUI configuration.

13. A non-transitory computer-readable medium storing software comprising instructions executable by one or more computers which, upon such execution, cause the one or more computers to perform operations comprising:

establishing a connection between a client information handling system (IHS) and a server IHS;

requesting, by the client IHS and to the server IHS, user preferences associated with the client IHS and the user, the user preferences indicating two or more desktop graphical user interface (GUI) configurations;

receiving, by the client IHS and from the server IHS, data indicating the user preferences;

receiving, by the client IHS, user input indicating a selection of one of the desktop GUI configurations;

displaying the selected desktop GUI configuration, including:

identifying, based on the user preferences, one or more monitors connected to the client IHS for displaying the selected desktop GUI configuration;

identifying, based on the user preferences, a first subset of computer-executable applications, of a plurality of computer-executable applications, associated with the selected desktop GUI configuration; and displaying the selected desktop GUI configuration on the first monitor, including displaying a graphical representation of the first subset of the computer-executable applications within the selected desktop GUI configuration.

14. The non-transitory computer-readable medium of claim 13, the operations further including:

identifying creation of an additional desktop GUI configuration at the client information handling system, including:

identifying a mapping of the additional desktop GUI configuration to one or more of the monitors; and identifying a second subset of the computer-executable applications associated with the additional desktop GUI configuration.

15. The non-transitory computer-readable medium of claim 13, the operations further including:

detecting an additional monitor connected with the client IHS, and in response:

identifying a mapping of the additional monitor for the selected desktop GUI configuration.

16. The non-transitory computer-readable medium of claim 13, the operations further including:

updating the selected desktop GUI configuration, including updating a mapping of the monitors; and synchronizing the updates with the server IHS.

17. The non-transitory computer-readable medium of claim 13, the operations further including:

detecting launch of a new computer-executable application within the selected desktop GUI configuration;

determining that the new computer-executable application is not allowed for the selected desktop GUI configuration; and blocking launch of the new computer-executable application for the selected desktop GUI configuration.

18. The non-transitory computer-readable medium of claim 13, the operations further including:

detecting connection of an external device to the client information handling system within the selected desktop GUI configuration;

determining that the external device is not allowed for the selected desktop GUI configuration; and blocking connection of the external device for the selected desktop GUI configuration.

* * * * *